United States Patent Office 3,252,184
Patented May 24, 1966

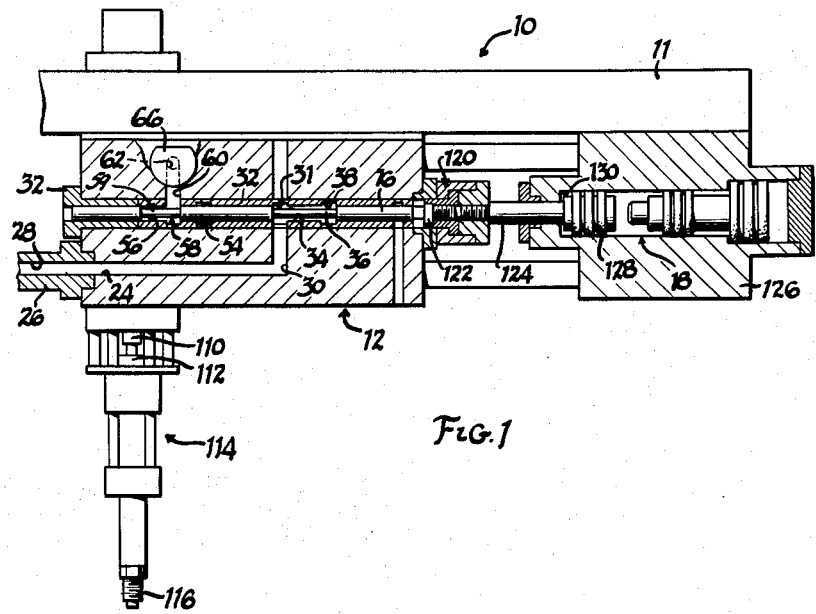
May 24, 1966 — L. D. NINNEMAN — 3,252,184
HOT RUNNER INJECTION ORIFICE CONTROL APPARATUS
Filed April 8, 1965 — 2 Sheets-Sheet 1
INVENTOR.
LAWRENCE D. NINNEMAN
ATTORNEYS

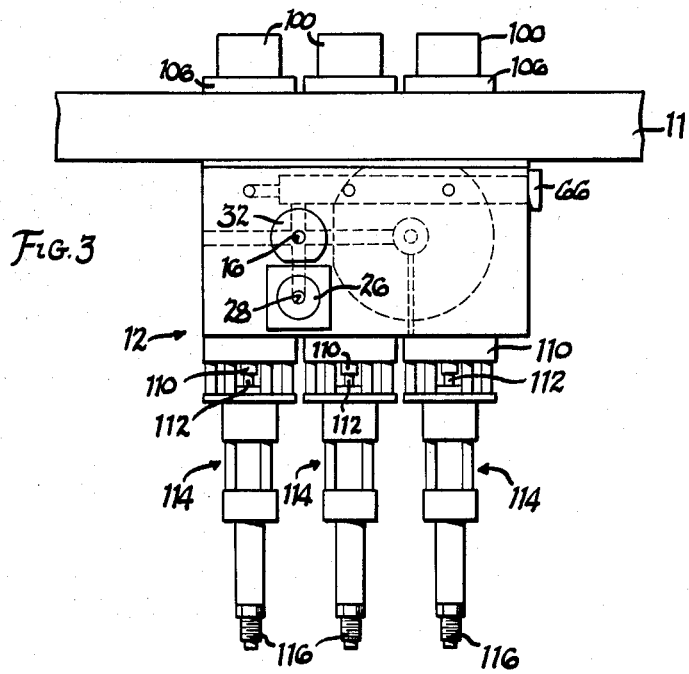
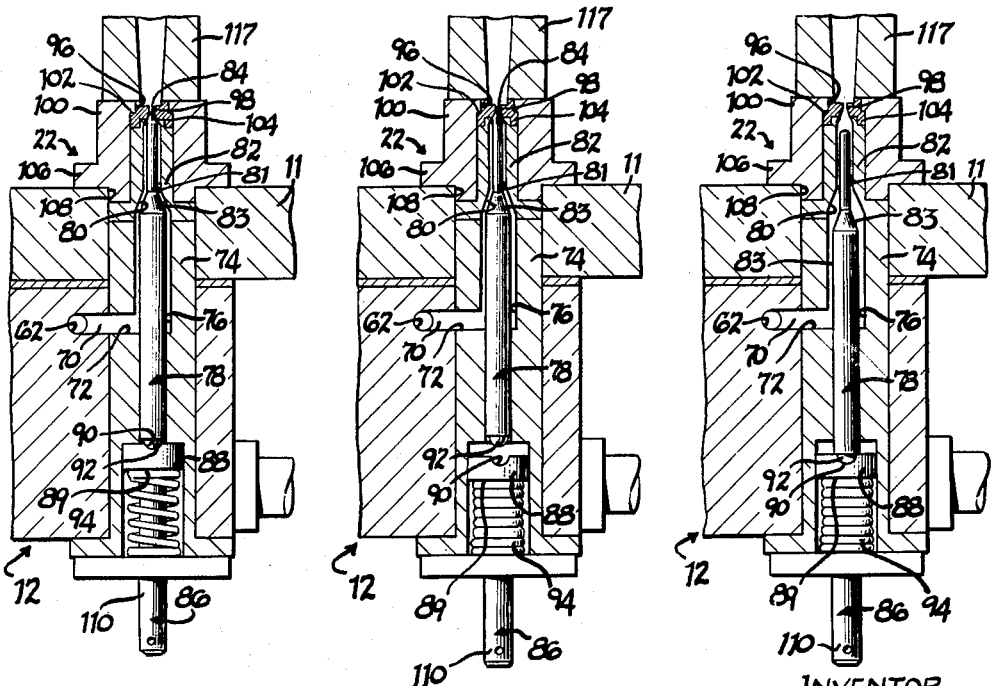

3,252,184
HOT RUNNER INJECTION ORIFICE CONTROL
APPARATUS
Lawrence D. Ninneman, Toledo, Ohio, assignor to Owens-Illinois, Inc., a corporation of Ohio
Filed Apr. 8, 1965, Ser. No. 446,586
5 Claims. (Cl. 18—30)

The present invention relates generally to a hot runner injection orifice control and more particularly to an improved system, including a method and an injection orifice metering apparatus for controlling the orifice discharge rate at which plasticized material is (1) dispensed through a runner and (2) (a) injected into an article-forming injection mold, such as a parison mold or the like or (b) extruded for some other purpose. Such injection orifice control insures uniform distribution of and precise volumetric control over the plasticized material entering the injection mold. The novel orifice control system of this invention is particularly useful where using a single accumulator to feed a plurality of injection orifices.

The apparatus for accumulating a charge of plasticized material disclosed in my United States application Serial No. 209,723, filed July 13, 1962, assigned to the assignee of the present invention, may be used in conjunction with this invention to accurately meter plasticized material through an orifice.

It has been proposed in the past (for example, see United States Patent 3,024,498) that high velocity hot runner injection molding of plastic articles be accomplished by use of a system which compresses a charge of plasticized material into a space within a stationary platen between an accumulator chamber having a ram and one or more injection orifices. The opening and closing of each injection orifice is controlled by a pin directly secured to and displaceable with the piston of an orifice control cylinder mounted on a moveable injection head. Each orifice control cylinder, along with the attached orifice control pin, is extended and retracted to close and open the associated injection orifice opening by a timer mechanism which is endeavored to be coordinated with the extension and retraction of the accumulated ram.

Such prior art systems, when used to rapidly produce plastic articles seriatim, have exhibited serious problems in product quality control. That is to say at production speeds, it becomes virtually impossible, using a timer mechanism, to accurately coordinate the cyclic opening and closing of the orifice control pin, which are directly displaced by the orifice control cylinders, with respect to the cyclic extension and retraction of the accumulator ram. Consequently, an imprecise volume of plastic material will be displaced along each runner through each gate or orifice opening and injected into the main mold cavities. Thus, the degree of quality control attained is relatively poor. Also, mold flashing, packing or compression of extra material into the mold frequently results. Packing increases the cost of manufacturing, induces internal stress in the region of each orifice and causes dimensional variations and thermal flaws in the final article. Under such conditions, the series of molded articles will each have a different heat history and, thus, product uniformity will not be attained. Furthermore, because of the inexact coordination between the displacement of the orifice control pins and the movement of the accumulator ram, the degree of compaction of the plasticized material charged within the accumulator chamber between the accumulator ram and the orifice control pins will vary further reducing the quality control attainable at production speed. Also, compression of the plasticized material directly against the orifice control pins subjects the orifice control pins to a high stress as the pins remain in their closed position during advance of the accumulator ram.

In view of the foregoing, it would be a valuable contribution to the hot runner injection orifice control art to provide a system for precisely controlling the discharge rate of plasticized material being injected from an accumulator chamber into one or more article-forming molds through injection orifices to thereby achieve a uniformity of material distribution and precise volumetric control so that the resulting product will be uniform, essentially without dimensional variations and thermal flaws. The present invention provides such a system.

In the presently preferred embodiment of this invention a novel apparatus is provided wherein the opening and closing of the orifice control pins in a hot runner injection system are directly responsive to changes in accumulator pressure wrought by the extension and retraction strokes of the accumulator ram, rather than by use of a timer mechanism. Thus, the displacement of the orifice control pin, being directly and casually actuated by accumulator pressure, is automatically coordinated with movement of the accumulator ram and, hence, the proper rate of plastic material will be precisely metered through each injection orifice, no matter what the operating speed of the molding machine. In the presently preferred embodiment, each orifice control pin is structurally floating with an orifice injection nozzle casing being spring biased to the closed position during the return stroke of the accumulator ram. Each pin is opened by pressure created by the displacement of plastic material, which has already been fully compressed, from the accumulator chamber responsive to advance of the accumulator ram against only frictional resistance.

When a single accumulator and a plurality of orifices and orifice control pins are utilized in a hot runner injection system, each orifice pin has an orifice control cylinder which may be adjusted to vary the permissible displacement of its associated orifice control pin. By adjusting the respective permissible displacements of the several orifice control pins through regulation of the piston stroke of the associated orifice control cylinder, the pressure and thus, the volumetric discharge at each orifice is precisely controlled. Thus, the discharge rates of each orifice may be equated when the same article is being molded at each mold, or when molded articles of different sizes are being fabricated, the discharge rates through the several orifices may be disproportionally ratioed to suit the need.

More specifically, the presently preferred embodiment of this invention embodies an orifice control system for a hot runner injection system wherein plasticized material is delivered to a feed block by a plasticizer-extruder or the like and is displaced along a predetermined travel path through the feed block along a displaceable spool into an accumulator chamber, the exit of which is initially closed. As plasticized material fills the accumulator chamber the accumulator piston is displaced by the incoming plasticized material toward its fully retracted position. When the accumulator piston reaches its fully retracted position, a pressure switch is actuated which causes the displaceable spool to be displaced a distance sufficient to close the accumulator chamber entrance through which the plasticized material initially enters while retaining the accumulator chamber exit in a closed position. Thus, the pressure in accumulator chamber is retained.

Thereafter, the spool is displaced an additional distance sufficient to open the accumulator chamber effluent exit at which time the accumulator piston and ram commence their extension stroke. This displaces the plastic material along the displaceable spool toward a plurality of injection orifice assemblies. At this time, fluid under pressure is introduced into the rod side of each orifice control cylinder to cause the piston rods thereof to be retracted. This collapses each spring normally biasing the respective orifice control pin to the closed positon, leaving the orifice control pins held in their closed positions solely by frictional forces. Consequently, the pressure of the plastic material being discharged from the accumulator chamber by the advancing accumulator piston displaces the pins from their closed position to their fully open positon as the plasticized material enters an annular chamber about each pin. This accommodates flow of the plasticized material through the several orifices into the respective article-forming injection molds. Of course, the head loss and consequently the pressure drop through the several lines leading to the several injection orifices will be different and, consequently, the magnitude of displacement through which each orifice control pin will move must be carefully conrolled through adjustments to insure that the proper discharge rate sufficient to appropriately uniformly fill each injection mold is maintained.

As the accumulator piston and ram complete their extension stroke, evacuating the accumulator chamber of plasticized material, the pressure of the plasticized material against the several orifice control pins will be sharply reduced, approaching zero, and a rod carried collar associated with the accumulator cylinder will actuate a second pressure switch to de-actuate the several orifice control cylinders and to accommodate and retract the accumulator piston and ram. Deactuation of the office control cylinders permits each orifice control spring to bias the associated orifice control pin against the adjacent orifice to promptly shut-off the flow of plasticized material through that orifice.

Thereafter, the displaceable spool is returned to its original position and the injection molding apparatus is ready to commence the next cycle.

Thus, the quality control of the articles being molded is extremely precise and an exact uniform rate of discharge may be maintained through the respective orifices by careful control of the permissible distance through which each orifice control pin may be displaced. This varies the flow area between the injection orifice casing and the orifice control pin so that the precisely proper amount of material is permitted to pass therethrough.

Accordingly, it is a primary object of this invention to provide an improved system, including method and apparatus, for precisely controlling the orifice discharge rate of plasticized material displaced through a runner and injected through the orifice opening or gate into an article-forming mold cavity.

Another object of the present invention is the provision of a novel apparatus, including a single master injection system, for accurately controlling or metering the rate of discharge of plasticized material from a single accumulator through a plurality of injection orifices into a plurality of article-forming mold cavities, such as parison molds, to thereby provide for an increased production rate with lower machine and tooling costs.

Another object of the present invention is the provision of a novel hot runner injection orifice control system which provides for an increase in production rate with lower machine and tooling costs and which avoids packing at the orifice and flashing at the mold.

A further object of the present invention is the provision of a novel hot runner injection orifice control system wherein the opening and closing of the orifice control pins are precisely coordinated with the cyclic extension and retraction of the accumulator ram.

An additional objective is the provision of a novel hot runner injection orifice control system which provides a selective control over the gate or orifice opening through which the plasticized material is introduced into the article-forming mold to achieve product uniformity by minimizing any possibility of thermal flaw, mold flashing and the like in the resultant article.

Another and no less important object of the present invention is the provision of a novel orifice control which not only opens the orifice in precise coordination with the stroke of the accumulator ram and similarly shuts off the orifice opening to prevent drooling but also functions as a discharge rate control to insure precise flow regulation of the material injected into the mold cavity.

Another important object is the provision of a novel orifice control pin arranged so as to be floating within a stationary nozzle, which is immediately and directly responsive to changes in accumulator pressure exposed thereto.

These and other objects and features of this invention will become more fully apparent from the following description and appended claims in conjunction with the accompanying drawings, wherein:

FIGURE 1 is a side elevational view shown partly in cross section of an injection molding machine equipped with the novel hot runner injection orifice control system of the present invention;

FIGURE 2 is a plan view partly in cross section of the injection molding machine of FIGURE 1;

FIGURE 3 is a front elevational view of the injection molding machine of FIGURE 1;

FIGURE 4 is a fragmentary enlarged view of the novel hot runner injection orifice control assembly of the present invention with the orifice control pin in the fully closed position;

FIGURE 5 is an enlarged fragmentary side elevational cross sectional view similar to FIGURE 4, but illustrating the plunger in the retracted position with the orifice control pin retained frictionally in its closed position; and FIGURE 6 is an enlarged fragmentary side elevational cross sectional view similar to FIGURES 4 and 5, with both the plunger and the orifice control pin displaced into the retracted position to accommodate and meter the flow of plasticized material injected into the article-forming cavity adjacent the orifice opening.

Reference is now made to the drawings, FIGURES 1 through 6, which depict a presently preferred hot runner orifice control embodiment of this invention. Fundamentally the purposes of the orifice control of this invention are to (1) cyclically shut-off flow at the orifice, to prevent drooling, packing and mold flashing due to over pressuring a mold cavity, at a point in time exactly coordinated with the cessation of discharge of the plasticized material from the accumulator chamber, and (2) to provide an accurately metered orifice discharge rate when in the open position to insure both uniformity of cavity filling and exact volumetric control of the quantity of influent plasticized material injected into the mold per molding sequence, when used to injection mold articles, parisons and the like.

*General*

Generally speaking, the structure of the embodiment depicted in the figures comprises an injection molding apparatus 10, the accumulator portion of which may correspond to that disclosed in United States application Serial No. 209,723, previously referred to. Injection molding apparatus 10 comprises a feed block 12 supported by a frame 11 and through which influent plasticized material passes into an accumulator chamber 14 contained within the feed block 12. To get to the accumulator chamber 14 the plasticized influent material must pass through chambers and passages provided between a displaceable spool 16, which is actuated by a cylinder assembly 18, and a spool sleeve or bushing 32. Periodically the plasticized material accumulating in accumulator chamber 14, being pre-compressed therein, is discharged therefrom by the advance of an accumulator piston 20, which is cylinder driven through its extension stroke. The plasticized material discharged from the accumulator chamber 14 is distributed in a plurality of orifice control assemblies 22 where the plasticized material being displaced urges each orifice control assembly 22, which is selectively settable, to the fully opened position accommodating precise dispensing of the plasticized material through an orifice. The material passing through each orifice, respectively, may be injected into an article-forming injection mold cavity, for example, an injection parison mold, the parison of which is subsequently blow molded into a desired configurated container. The orifice control assemblies 22 may also be used to merely extrude a precise amount of plasticized material through each orifice.

Structural arrangement

Specifically, the feed block 12 is provided, as depicted in FIGURE 1, with an influent bore 24 to which is attached a feed line 26 having an internal or central opening 28 and through which plasticized material is delivered, for example, from a plasticizer (not shown) of conventional type. The bore 24 communicates with an upwardly directed passage 30 which opens into an annular chamber 31 disposed between the displaceable spool 16 and the stationary spool sleeve 32 and comprising an annular groove in the sleeve 32. Communication between the passage 30 and the chamber 31 exists only when the spool is displaced so as to be situated in its leftward-most position, which position is illustrated in FIGURES 1 and 2. In this position the chamber 31 communicates with an annular passage 34, formed by a reduced portion 36 of the displaceable spool 16. The annular passage 34 in turn communicates with another chamber 38 also disposed intermediate the displaceable spool 16 and the spool stationary sleeve 32, and also comprising an annular groove in the sleeve 32.

As illustrated in FIGURE 2, when the displaceable spool 16 is in its leftward most position, the chamber 38 is in communication with a generally horizontally disposed passage 40 in the feed block 12. The passage 40 has an entrance opening 42 through an accumulator bushing 44 leading into the accumulator chamber 14 adjacent the bullet nose surface 46 of the accumulator piston 20.

The effluent opening 50 of the accumulator chamber 14 communicates with a generally horizontally disposed passage 52, which terminates at an annular chamber 54 which comprises an annular groove in the spool sleeve 32. When the displaceable spool 16 is in the illustrated leftward most position, the chamber 54 is not in communication with any passage, chamber, opening or the like. However, when the spool cylinder control 18 is actuated moving the displaceable spool 16 to its rightward-most position, the chamber 54 is brought into communication with an annular passage 56 (best seen in FIGURE 1) which is formed as a reduced diameter portion 59 of the displaceable spool 16. In such a position the annular passage 56 communicates with an annular chamber 58 formed as an annular groove in the spool sleeve 32.

The annular chamber 58, in turn, communicates with the generally vertically disposed passage 60 (FIGURE 1) into an elongated generally horizontally disposed channel 62, best illustrated in FIGURE 2. The channel 62 extends in part into the feed block 12, with the majority of the channel 62 constituting a hollow passage in a sleeve insert 64, which has a flange 66 in surface engagement with the feed block 12. Three generally horizontally disposed orifice control influent passages 70 divide the flow of plasticized materials, discharged from the accumulator chamber and passing through the channel 62, into three streams of flow to accommodate simultaneously formation of three separate inject molded articles.

Since all three orifice control assemblies are illustrated as being structurally and functionally the same, only one will be described. Each orifice control influent passage 70 opens at 72 through an orifice control sleeve 74 into an annular chamber 76, formed as an enlarged diameter groove in the sleeve 74 adjacent a floating orifice control pin 78, which is reciprocally displaceable during the cyclic operation of the apparatus 10. The annular chamber 76 opens into a frusto-conical chamber 80 at the upper end of the chamber 76. Chamber 80 in turn opens into an annular chamber 81. The frusto-conical chamber 80 is a tapered groove formed in an insert 82 adjacent a tapered portion 83 of the pin 78, while the annular chamber 81 is an enlarged diameter groove in the insert 82. The pin 78 has a reduced diameter tip portion 84 slidably disposed in spaced relation within the chamber 81. When the floating orifice control pin 78 is in its fully closed position, as viewed in FIGURE 4, the pin is biased upward, to close the orifice opening 98, by a plunger 96. The plunger 86 has a shaft end 110 and a flanged upper end 88 equipped with a recess 90 which matches the lower end surface 92 of the floating orifice control pin 78. The lower surface 89 of the flange 88 of the plunger abutment member 86 abuts one end of a spring 94 which causes the plunger 86 to bias the orifice control pin 78 to the fully closed upward position illustrated in FIGURE 4. The tip 84 of the orifice control pin 78 is shaped to match the contour of the orifice insert 96 at the orifice opening 98. The orifice insert 96 is retained in proper orientation with respect to the floating orifice control pin 78 by engagement with the insert 82 and by an orifice retainer 100 which engages at a reduced diameter portion 102 the annular flange 104 of the orifice 96. The orifice retainer 100 has a flange 106 in surface-to-surface engagement with the frame 11 by a threaded or like connection as the interface 108.

As best depicted in FIGURE 3, the shaft 110 of the plunger 88 is pinned or otherwise coupled to the piston rod 112 of one of the orifice control cylinders 114. As is evident by inspection of FIGURE 3, each orifice control assembly 22 is equipped with a separate orifice control cylinder 114. The end of each orifice control cylinder 114 opposite the piston rod 112 is equipped with an adjustment orifice control stop pin 116 which restricts the distance which each piston rod 112 of an orifice control cylinder 114 may be retracted. Thus, each orifice control stop pin 116 may be independently and separately adjusted to vary the distance which each plunger 86 is retracted to compress the coiled spring 94 as depicted in FIGURE 5. This retraction remove the recess 90 of the plunger out of contact with the downward end surface 92 of the orifice control pin. Influent plasticized material flowing into the annular chamber 76, the frusto-conical chamber 80 and the annular chamber 81 between the pin, the pin sleeve 74 and the insert 82, respectively, will then readily displace the orifice control pin 78 downward from the position of FIGURE 5 to the position of FIGURE 6, thus reengaging the end surface 92 and the recess 90. However, if desired, the plunger 86 and the pin 78 may be integral, with omission of the spring 94 where the cylinder 114 is single acting to close the pin rather than to accommodate opening of the pin. In either case, the displacement of the pin 78, being selectively settable by adjustment of the orifice control pin stops 116, will provide or may be used to provide a different flow area at each of the three orifice control assemblies 22. Consequently, since the pressure at each orifice 92 will vary, the distance and head loss from the accumulator chamber 14 to the respective orifice openings being different for each orifice, adjustment of the respective orifice control pin stops 116 may be used to equate the pressure at which the plasticized material will be discharged cyclically through each orifice into each injection mold to thereby accurately balance the discharge rates at the orifices. Also, when articles of different shape and volume are being simultaneously formed at the different molds, adjacent of the stop pins 116 may be used to precisely ratio the different pressures at which the plasticized material is discharged to each orifice 96 to thereby meter the exact rate of flow required during the accumulator ram extension stroke for the proper, uniform formation of each different article in the respective molds.

The displaceable spool 16 is provided with a coupling 120 at its right terminal end, as seen in FIGURES 1 and 2. The coupling 120 integrally units the right terminal end 122 of the displaceable spool 16 with the piston rod 124 of the spool control cylinder assembly 18. The spool control cylinder 18 comprises a cylinder housing 126 and includes a valve piston 128 integral with one end of the rod 124. A hydraulic chamber 130 is disposed between the left face of the piston 128 and the cylinder housing 126 and is connected to a hydraulic system (not shown) through a port 132 (FIGURE 2). The cylinder assembly 18 also includes a stop piston 134. A hydraulic chamber 141 exists between the pistons 128 and 134 and is connected to the hydraulic system (not shown) through a port 139. Also, a chamber 140 is provided between the right surface 142 of the stop piston 134 and the left surface 144 of an end cap 146, which cap is secured at 148 by threaded connection or the like. Hydraulic fluid communicates with the hydraulic chamber 140 through port 150. When chamber 139 is being evacuated of hydraulic fluid and the chamber 130 is being filled with hydraulic fluid, the displaceable spool 16 is urged into a position intermediate its extreme right and left positions. In this position, surface 138 of piston 128 engages surface 136 of piston 134 as the piston 134 is held stationary by fluid in chamber 140. At this point, the plasticized material which has been delivered to the accumulator chamber 14 is isolated by the spool 16 within the accumulator chamber in pressure 140. When the hydraulic fluid in the chamber 140 is subsequently exhausted through the port 150 the stop piston 134 moves to the right accommodating further displacement of the displaceable spool 16. When spool 16 assumes its rightward-most position the chamber 54 is in communication with the chamber 58, along the annular passage 56. This accommodates discharge of the plasticized material from the accumulator chamber 14.

The cylinder housing 126 also slidably supports an accumulator ram 160 which is secured to the end 162 of the accumulator piston 20 by means of a threaded retainer 164 or the like. When the ram 160 is fully retracted a pressure switch schematically illustrated as a block and designated 167, disposed between the retainer 164 and a bushing 165, is actuated for purposes subsequently to be more fully described. Between the right surface 166 of the accumulator ram 160 and the surface 168 of the cylinder housing 126 is located a hydraulic chamber 170 which is in communication with a hydraulic supply system (not shown) through a port 172 (FIGURE 2). When fluid is cyclically introduced into the chamber 170 through the port 172, the accumulator piston 20 and the accumulator ram 160 are displaced toward the left (as viewed in FIGURES 1 and 2) causing the precompressed plasticized material previously admitted to the accumulator chamber 14 to be discharged therefrom through the orifice control assemblies 22 into the several injection molds 117. A pressure switch 174, schematically illustrated as a block and situated at a fitting 176, is engaged by a stop collar 178 when the accumulator piston 20 is in its fully extended leftward-most position. The stop collar 178 is unitarily displaceable with the accumulator piston 20 by reason of its integral connection to the accumulator ram 160 through the rod 180. The pressure switches 167 and 174 may be of the type disclosed in United States application Serial No. 209,723, filed July 13, 1962, and assigned to the assignee of the present invention.

*Operation*

Plasticized material is delivered to the feed block 12 from a plasticizer or the like (not shown) through a line 26 into the bore 24 and the passage 30. From there the plasticized material flows into the chamber 31. Fluid is introduced through port 139 into chamber 141 between the stop piston 134 and the valve piston 128 in the spool control cylinder assembly 18. This causes the displaceable spool 16, which is integrally connected to the piston rod 124, to be displaced to its leftward-most position as viewed in FIGURES 1 and 2.

In this position, the plasticized material being displaced through the passage 30 into the chamber 31 flows along the annular passage 34 into the annular chamber 38 down the generally horizontally disposed passage 40 and into the accumulator chamber 14. When sufficient plasticized material has been displaced so as to fill not only the accumulator chamber 14 and the passage 40 but also the generally horizontally disposed accumulator effluent passage 52 and the annular chamber 54 about the displaceable spool 16, the plasticized material supplied to the accumulator chamber 14 will have exerted a rightward force on the bullet nose 46 of the accumulator piston 20 thereby displacing the piston 20 and the accumulator ram 160 to their fully retracted, rightward-most positions. This retraction forces hydraulic fluid out of the chamber 170 at the right end surface 166 of the accumulator ram 160.

When the enlarged head 163 of the ram 160 engages the bushing 165, the pressure switch 167 is actuated to stop the flow of plasticized material into the accumulator chamber 14. This is accomplished by causing oil to be introduced into the chamber 130 of the displaceable spool control cylinder assembly 18. This retracts the piston rod 124 to the right, drawing with it the integrally attached displaceable spool 16, while hydraulic fluid contained within the chamber 141 is at the same time exhausted through the port 139. The rightward displacement of the valve piston 128 will be brought to a stop by engagement between the surface 138 of the valve piston and the surface 136 of the stop piston 134, the stop piston 134 being held in the position illustrated in FIGURE 2 by retention of hydraulic fluid in the chamber 140. This situates the displaceable spool 16 in a mid-position or intermediate position such that flow of plasticized material into the accumulator chamber from the annular chamber 31 is prohibited and discharged of the plasticized material from the accumulator chamber 14 through the annular chamber 54 is similarly prohibited. Thus, by isolating the plasticized material within the accumulator chamber 14 and the passages 40 and 52, the pressure developed in the plasticized material within the accumulator chamber 14 is preserved. Thereafter, the hydraulic fluid in the chamber 140 is released accommodating rightward movement of the stop piston 134 and farther rightward movement of the valve piston 128 with its piston rod 124 and the displaceable spool 16. This moves the displaceable spool 16 to its rightward-most position, thus, retaining the annular chamber 31 out of communication with the passage 40 while opening communication between the accumulator chamber 14 and the three orifice control assemblies 22 by providing communication between the annular chambers 54 and 58 along the annular passage 56 at the spool 16.

At the same time, hydraulic fluid under pressure is supplied to the chamber 170 causing the accumulator ram 160 to advance toward the left pushing the accumulator piston rod 20 to dispense a specific predetermined volume of plasticized material from the accumulator chamber 14. Also, at this time hydraulic fluid under pressure is supplied to the rod side of each of the three orifice control cylinders 114 (FIGURE 3). This retracts the piston rods 112 of the orifice control cylinders causing the integrally attached plungers 86 to be stroked downward from the position of FIGURE 4 to that of FIGURE 5 thereby collapsing the three orifice shut-off springs 94. This removes the closing force from the orifice control pins 78 as each recess surface 90 is separated from the plunger 86 from its associated end surface 92 of the orifice control pin 78. The pins are retained in the position of FIGURE 5 by friction.

The pressure exerted by the entrance of hydraulic fluid under pressure into the chamber 170, as previously mentioned, will force the accumulator ram and accumulator piston 20 to the left driving the piston 20 through the accumulator chamber 14 fully displacing the plasticized material contained therein through (1) the passage 52, (2) the annular chamber 54, (3) the annular passage 56, (4) the annular chamber 58, (5) the generally vertically disposed bore 60, and (6) the generally horizontally disposed channel 62 into the three orifice control influent passages 70.

Fluid passing through each influent passage 70 is displaced through the opening 72 into the annular chamber 76, the frusto-conical chamber 80 and the annular chamber 81 adjacent the surface of the orifice control pin 78. The frusto-conical surface 83 of each pin 78 adjacent the frusto-conical chamber 80 is therefore subject to the accumlator pressure transmitted through the displaceable plasticized material. This pressure acts normal to the frusto-conical surface 83 of each orifice control pin 78 and thus will have a downward component of force which will urge each orifice control pin 78 downward to the open position. This downward or backstroke of each orifice control pin 78 will cause the end surface 92 of each pin to again seat itself within the matching recess 90 of the plunger 86 as the pins 78 move from the position of FIGURE 5 to that of FIGURE 6. A flow area through which the plasticized material may be displaced into the injection mold cavity adjacent each pin 78 and associated insert 82 will thus be provided. Each such flow area is a function of the distance the orifice control pin has been downwardly displaced. Thus, each orifice control pin acts as a metering needle valve and, as previously mentioned, each orifice control cylinder 114 may be adjusted by means of its pin stop 116 to vary the individual distances through which each piston rod 112, and, accordingly, each pin 78, will be displaced. The distance each piston rod 112 is displaced is equal to the distance each associated plunger 86 and pin 78 are displaced. The greater the downward displacement of the plunger 86 and the pin 78, the larger will be the flow area through which the plasticized material is discharged into the injection mold 117.

Thus, the flow rate at which plasticized material is dispensed into the injection mold may be precisely controlled to insure both uniformity of cavity filling and precise volumetric regulation of the quantity of plasticized material introduced into each injection mold as the overall injection molding apparatus 10 is cyclically operated. Thus, the same exact quantity of plasticized material may be discharged through each of the three orifice openings 98, or the flow rate through the respective orifice openings 98 may be proportioned to accommodate simultaneous molding of articles having different forms and requiring different volumes of plastic for proper, precise fabrication.

Since when the plunger 86 is retracted by introduction of a fluid under pressure on the rod side of the orifice control cylinder 114, the springs 94 exert no force upon the associated orifice control pin 78 at that time. Consequently, the only force required to displace each orifice control pin downward, from the position depicted in FIGURE 5 to that depicted in FIGURE 6 to thereby open the orifice opening 98, is a very low pressure, since only frictional resistance holds the orifice control pin in the closed position with the plunger 86 retracted.

It is significant that no timing mechanism is essential to the periodic opening and closing of the three orifice control pins 78 but rather these pins are directly responsive to accumulator pressure transmitted through the displaced plasticized material being dispensed from the accumulator chamber 14. Thus, the orifice is promptly opened without delay at the inception of the stroke of the accumulator piston rod 20 to accommodate immediate flow through the orifice opening 98 into the injection mold cavity 117, the orifice control pin assuming the position illustrated in FIGURE 6.

When the accumulator ram 160 and the accumulator piston rod 20 have completed their extension stroke, the stop collar 178 will have been brought into engagement with the cylinder housing 126 at end cap 176 such that the stop collar 178 actuates the pressure switch 174. The pressure switch 174, when actuated, causes the orifice control cylinders 114 to be deactuated promptly facilitating upward extension of each plunger 86 responsive to the mechanical biasing action of the associated coil compression spring 94. This moves the orifice control pin 78 upward promptly upon cessation of displacement of plasticized material from the accumulator chamber 14 as the pressure therefrom transmitted to the plasticized material is sharply reduced. This seals off the orifice opening 98 in exact timed relation with retraction of the accumulator piston 20 whereby drooling and packing at the orifice openings are obviated.

The displaceable spool 16 is, thereafter, returned to its leftward-most position by introduction by hydraulic fluid under pressure into the chamber 141 through the port 139 while the fluid in chamber 130 is exhausted through the port 132. In this position, another cycle of operation is initiated. Additional plasticized material is thus accumulated in the accumulator chamber 14 which retracts the ram 160 in response to pressure exerted by the material upon the bullet nose 46 of the accumulator piston 20. Retraction of the ram 160 discharges hydraulic fluid from the chamber 170 through port 172, port 172 being open in response to the previously described actuation of pressure switch 174 to accommodate such fluid flow.

It is to be appreciated that when manufacturing the same article in the injection molds, the pressure at each orifice opening 98 is balanced by varying the downward backstroke through which each orifice control pin may be displaced. This is accomplished by adjustment of the orifice control pin stops 116 until equal pressure at the three orifice openings 98 is achieved. Thus, each orifice control pin 78 acts not only to shut-off the associated orifice opening 98 upon the completion of the accumulator stroke responsive to the sharp decline in accumulator pressure transmitted through the plasticized material but also functions as a needle valve accommodating individual orifice pressure control to create uniformity of orifice discharge and exact control of volumetric influent discharge into the injection molds.

While the above-described preferred embodiment of this invention has been described with reference to a single accumulator chamber 14 used to feed three orifice control assemblies 22, it is to be appreciated that any desired number of orifice control assemblies may be used in conjunction with a single accumulator or, in the alternative, each orifice control of this invention may be used in conjunction with its own accumulator.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an injection orifice control assembly for injection molding plasticized material in an article-forming mold, a container adapted to hold plasticized material, means for dispensing material from said container under pressure, an injection nozzle having an orifice through which material from the container can be introduced into said mold, and an orifice control pin having an end of a size and configuration (1) to close the nozzle orifice when the pin abuts the nozzle and (2) to accommodate the flow of material through the nozzle orifice when the pin is spaced from the nozzle, the pin having an exterior surface exposed to the plasticized material so that the pressure of said material biases said pin away from said nozzle orifice, the improvement of a first power means acting directly on said pin and normally biasing said pin end into contact with said nozzle, and second power means for overriding said first power means to remove the biasing effect of said first power means, thereby accommodating actuation of said pin by the pressure of said material to its position spaced from said nozzle free of the biasing effect of said first power means.

2. In an orifice control assembly as defined in claim 1, the further improvement wherein said first power means is a compression spring and the second power means is a fluid pressure actuated cylinder.

3. In an orifice control assembly as defined in claim 2 wherein a stop means secured to the cylinder is interposed between the spring and the pin, and actuation of the cylinder compresses the spring to space the stop means from the pin, thereby accommodating movement of the pin to its said spaced position under the pressure of plasticized material.

4. In an orifice control assembly as defined in claim 3 wherein means are provided to adjust the stroke of the cylinder to vary the degree of movement of the pin relative to the orifice.

5. In an orifice control assembly as defined in claim 1 wherein a plurality of individual molds are provided to receive plasticized material from a single source and a separate nozzle and a separate pin are provided for each mold, respectively, the further improvement of separate first and second power means for each pin and means for adjusting said power means to separately vary the degree of actuation of each pin.

References Cited by the Examiner

UNITED STATES PATENTS

| | | |
|---|---|---|
| 2,668,325 | 2/1954 | Goodwin. |
| 3,023,458 | 3/1962 | Seymour. |

FOREIGN PATENTS

| | | |
|---|---|---|
| 912,194 | 2/1945 | France. |
| 1,329,922 | 7/1962 | France. |
| 1,142,229 | 1/1963 | Germany. |

ROBERT F. WHITE, *Primary Examiner.*

R. B. MOFFITT, *Assistant Examiner.*